United States Patent [19]

Corradini

[11] Patent Number: 5,606,368
[45] Date of Patent: Feb. 25, 1997

[54] CABLE-DRIVEN PAN AND TILT MECHANISM

[75] Inventor: John Corradini, Tucson, Ariz.

[73] Assignee: Boeckeler Instruments, Inc., Tucson, Ariz.

[21] Appl. No.: 317,876

[22] Filed: Oct. 4, 1994

[51] Int. Cl.$^6$ .................................................. H04N 5/225
[52] U.S. Cl. ............................................ 348/373; 348/143
[58] Field of Search .................................. 348/373, 374, 348/375, 376, 142, 143, 151, 152, 154, 169; 354/288, 293; H04N 5/225

[56] References Cited

U.S. PATENT DOCUMENTS

| | | | |
|---|---|---|---|
| 3,868,706 | 2/1975 | Steingold | 348/335 |
| 4,310,136 | 1/1982 | Mooney | 248/278 |
| 4,420,238 | 12/1983 | Felix | 348/373 |
| 4,728,839 | 3/1988 | Coughlan et al. | 310/112 |
| 4,855,838 | 8/1989 | Jones et al. | 348/84 |
| 5,128,770 | 7/1992 | Inana et al. | 348/373 |
| 5,153,833 | 10/1992 | Gordon et al. | 364/424.02 |

*Primary Examiner*—Michael Lee
*Assistant Examiner*—Tuan V. Ho
*Attorney, Agent, or Firm*—Mark E. Ogram, P.C.

[57] ABSTRACT

A cable-driven pan and tilt mounting system for cameras and other similar and related devices which provides such devices with a limitless range of motion. The invention utilizes two motors with each motor independently controlling the panning or tilting of the camera, respectively. The use of a cable drive in the apparatus eliminates the inaccuracy inherent in similar gear-driven systems and further simplifies the design making it more cost-effective and efficient. Furthermore, even though no gears are utilized in the cable drive, the present invention simulates a geared motion and, in doing so, provides smooth and accurate repositioning for any device mounted to it.

20 Claims, 1 Drawing Sheet

5,606,368

CABLE-DRIVEN PAN AND TILT MECHANISM

BACKGROUND OF THE INVENTION:

This invention relates generally to pan and tilt mounting mechanisms used with equipment which must be frequently and accurately repositioned. More particularly, this invention relates to remote controlled pan and tilt mechanisms for use with cameras.

Remotely controlled video cameras are widely used today and their use and application is increasing. They are used for surveillance purposes in structures such as airports, stores, banks, warehouses, and a number of other locations too numerous to list. They are further used to collect and transmit data to human users from locations where humans are unable to observe first-hand. These areas include areas which are either hazardous to human health, such as toxic waste sites, or areas where humans are physically unable to enter, such as pipelines.

In order to maximize the visual data collected, a goal of these video systems is to provide the camera with as full a range of motion as possible. Consistent with this goal, these video cameras are usually mounted upon a pan and tilt head which is designed to rotate about a vertical axis (i.e. pan the camera) as well as about a horizontal axis (i.e. tilt the camera). This sort of mechanism provides the camera with a virtually limitless range of motion thereby maximizing the amount of visual data capable of being collected by the camera.

Present systems generally incorporate a motor and gearing system to achieve this motion. Specifically, these systems utilize a gearing system to provide the panning motion and a second gearing system to provide the tilting motion. Each of these gearing systems is powered by a single motor.

While these types of systems provide the range of motion desired, they do have their inherent disadvantages.

First of all, the designs are complex, employing a number of moving components. This makes repair and maintenance difficult and costly at times.

Further, where a high degree of accuracy is required, these systems may not be adequate. Specifically, normal machining tolerances permit some free play or "backlash" between the gear components. This results in the camera focusing on a point other than what it is intended to. This error may not be critical when the camera is focusing on a relatively near object, but when the point of focus is farther away, the error is greater.

While some designs have attempted to solve this inaccuracy problem inherent in gear-driven pan and tilt mechanisms, none have solved the problem utilizing a cable-driven pan and tilt mechanism. Further, the proposed solutions add to the complexity of the mechanism.

Considering these drawbacks and the proposed solutions, it is clear that a simple, low-maintenance and low-cost pan and tilt mechanism is needed that will provide the range of motion desired while still providing the accuracy required. The following invention accomplishes these goals.

SUMMARY OF THE INVENTION

The invention is a motorized pan and tilt mechanism for use with a video camera and related devices. This mechanism provides a camera with a full range of motion thereby allowing the camera to be rotated about a horizontal axis (i.e. tilted) and about a vertical axis (i.e. panned) while employing a simple and efficient design.

The design essentially allows the pan and tilt motions of the camera to be accomplished without the use of gears while simulating the desired smooth motion of common geared pan and tilt mounting units.

The invention is basically comprised of three main components: a mounting plate, a panning component, and a base plate. The camera is attached to a mounting plate which rotates about a horizontal axis. This motion is controlled by a motor which is mounted on the panning component. The motor has a drive shaft oriented parallel to the horizontal axis about which the mounting plate rotates. This drive shaft is attached to a drive gear which mates with a driven gear. The driven gear is attached to the mounting plate. This allows the plate to tilt freely under the control of the motor.

The panning motion is made possible through the design of the panning component and related hardware. The panning component is mounted to a base plate and is capable of rotating about a vertical axis. The panning component contains a curvilinear section which lies in a plane parallel to the base plate. A wire cable is attached to this curvilinear section at two points and continuously contacts the majority of this section. This same wire cable is also wrapped around an output shaft of a second motor a number of times. This second motor is attached to the base plate and oriented so that its output shaft is parallel to the vertical axis about which the pan unit rotates. Further, the motor is oriented such that its output shaft is in close proximity to the apex of the curvilinear section. This allows the panning component to rotate freely and smoothly under the control of the second motor.

The concepts and design used to control the panning motion may also be used to control the tilting motion of the camera.

The invention allows the pan and tilt motion of a camera to occur independently of each other without the use of gears while still simulating a geared motion.

The invention, together with the various embodiments thereof will be more fully explained by the accompanying drawings and the following descriptions.

DETAILED DESCRIPTION OF THE INVENTION

Figure 1:
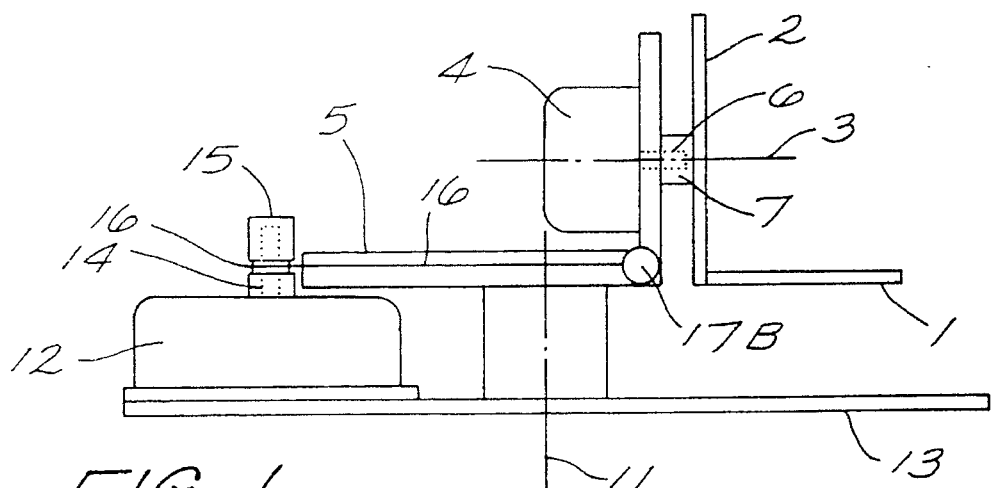
FIG. 1 is a side elevation view of the invention showing the major components and their relation to each other

FIG. 1 shows the side view of the preferred embodiment of the invention.

A camera is mounted on mounting plate 1 of tilting unit 2. Tilting unit 2 is rotatable about horizontal axis 3. The tilting motion is controlled by first motor 4 which is mounted on panning unit 5.

Figure 3:
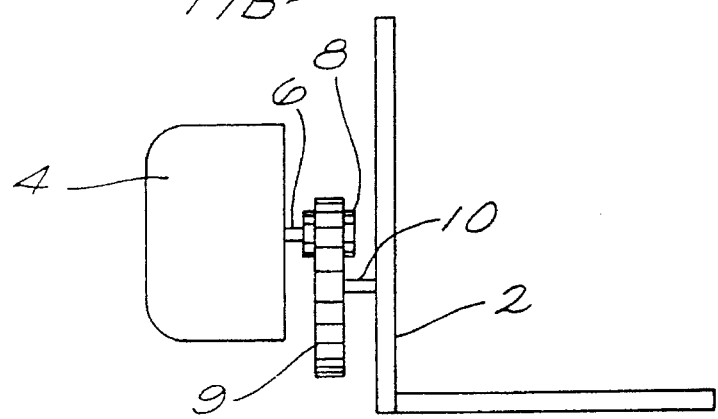
FIG. 3 is a detailed view of an additional embodiment of the invention showing the gearing mechanism allowing the first motor to control the tilting function.

In the preferred embodiment, the tilting motion is controlled by motor 4 with the use of gears. The motor has an output shaft 6 which is oriented parallel to horizontal axis 3. As can be clearly seen in FIG. 3, output shaft 6 is attached to drive gear 8. Drive gear 8 mates with driven gear 9 which is attached to tilting unit 2 via cylindrical member 10. This allows tilting unit 2 to rotate freely about horizontal axis 3 under the control of motor 4.

The panning motion occurs when panning unit 5 rotates about vertical axis 11. This motion is controlled by motor 12 which is mounted upon base plate 13.

Motor 12 has an output shaft 14 oriented parallel to vertical axis 11. Attached to output shaft 14 is a cylindrical member 15. A wire cable 16 is wrapped around cylindrical member 15 a number of times. The ends of wire cable 16 are attached to panning unit 5 at two points 17A and 17B. This is best illustrated in FIG. 2 which is a top elevational view of the invention.

Figure 2:
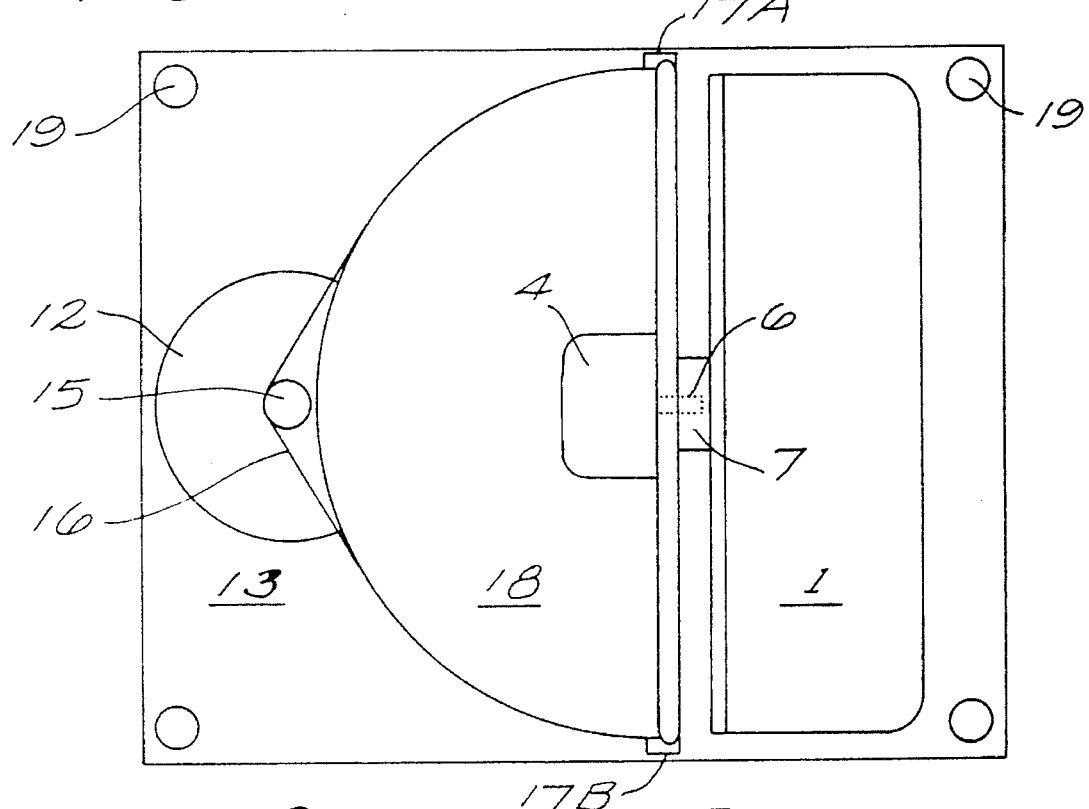
FIG. 2 is a top elevation view of the invention illustrating the function of the curvilinear portion of the panning section.

Also best illustrated by FIG. 2 is the orientation of wire cable 16 on panning unit 18 and the shape of panning unit 18 itself. In the preferred embodiment, panning unit 18 has a cylindrical section which lies in a horizontal plane. Wire cable 16 makes contact over the majority of the cylindrical portion of panning unit 18. Wire cable 16 ceases to make such contact when it extends to cylindrical member 15 attached to the motor's drive shaft 14.

In an alternative embodiment, panning unit 18 has a curvilinear section, as opposed to a cylindrical section, which lies in a horizontal plane. In this embodiment, as in the preferred embodiment, wire cable 16 makes contact over the majority of the curvilinear portion of panning unit 18. Wire cable 16 ceases to make such contact with the curvilinear portion when the cable extends to the motor's drive shaft 15.

FIG. 2 also illustrates the orientation of motor 12 such that its drive shaft 14 is in close proximity to the curvilinear section of panning unit 18.

As mentioned earlier, FIG. 3 is a view of the preferred embodiment of the components used to control the tilting motion of the invention. Output shaft 6 of motor 4 is attached to drive gear 8. Drive gear 8 mates with driven gear 9 which is attached to tilting unit 2 via cylindrical member 10. This allows motor 4 to control the motion of tilting unit 2 about horizontal axis 3

As an alternative, the tilting motion of the invention may be accomplished by employing a design similar to that used to control the panning motion.

In this alternative embodiment, the tilting motion obtained by the tilt unit, which moves mounting plate 1, uses a curvilinear section positioned about a horizontal axis and having a cable extending along a peripheral portion of the curvilinear section in a same manner as the curvilinear section and cable are used in the panning unit. A motor is in mechanical communication with the cable of the alternative tilt mechanism to provide selective motion to the tilt mechanism.

The invention can then be mounted on a desired location or device via mounting holes 19.

From the foregoing, it will be understood by those skilled in the art that the disclosed invention is a gearless pan and tilt mechanism capable of providing virtually limitless coverage. Further, even though gearless, the invention simulates geared motions while employing fewer components.

What is claimed is:

1. A pan and tilt mechanism for the mounting of a camera comprising:

a) a fixed base unit;

b) a pan unit having a curvilinear section lying substantially in a horizontal plane with a cable extending along a peripheral portion of said curvilinear section, said cable having a first end and second end, said first end fixably attached to a first point of said curvilinear section and the second end fixably attached to a second point of said curvilinear section, said pan unit pivotally attached to said base unit, said pan unit rotatable about a vertical axis;

c) a tilt unit upon which said camera is affixed, said tilt unit pivotally attached to said pan unit, said tilt unit rotatable about a horizontal axis;

d) a first motor positionally fixed on said pan unit for controllably rotating said tilt unit about said horizontal axis; and, e) a second motor positionally fixed on said base unit and in mechanical communication via a cylindrical member in contact with said cable for controllably rotating said pan unit about said vertical axis.

2. The pan and tilt mechanism according to claim 1 wherein said second motor includes a rotatable drive shaft oriented parallel to said vertical axis.

3. The pan and tilt mechanism according to claim 2 wherein said second motor controls a drive means for rotating said pan unit about said vertical axis.

4. The pan and tilt mechanism according to claim 3 wherein said wire cable is wrapped around said cylindrical member a plurality of times such that rotation of said drive shaft of said second motor results in a corresponding rotation of said pan unit about said vertical axis.

5. The pan and tilt mechanism according to claim 4 wherein said cable extends no greater than one-quarter of an inch from said cylindrical member to the point at which said wire cable first makes contact with said curvilinear section.

6. A cable-driven pan and tilt mechanism for the mounting of a camera comprising:

a) a fixed base unit;

b) a pan unit having a curvilinear section lying substantially in a horizontal plane with a cable extending along a peripheral portion of said curvilinear section and attached thereto, at two ends of the cable said pan unit pivotally attached to said base unit, said pan unit rotatable about a vertical axis;

c) a tilt unit upon which said camera is affixed, said tilt unit having a curvilinear section with a cable extending along a peripheral portion of said curvilinear section, and attached thereto at two ends of the cable said tilt unit pivotally attached to said pan unit, said tilt unit rotatable about a horizontal axis;

d) a first motor positionally fixed on said pan unit and mechanically connected to said tilt unit, said first motor for controllably rotating said tilt unit about said horizontal axis; and, e) a second motor positionally fixed on said base unit and in mechanical communication with said cable for controllably rotating said pan unit about said vertical axis.

7. The pan and tilt mechanism according to claim 6 wherein said first motor includes a rotatable drive shaft oriented parallel to said horizontal axis.

8. The pan and tilt mechanism according to claim 7 wherein said first motor controls a first drive means, said first drive means for rotating said tilt unit about said horizontal axis.

9. The pan and tilt mechanism according to claim 8 wherein said cable is wrapped around a cylindrical member attached to the drive shaft of said first motor a plurality of times such that rotation of said drive shaft of said first motor results in a corresponding rotation of said tilt unit about said horizontal axis.

10. The pan and tilt mechanism according to claim 9 wherein said cable extends no greater that one-quarter of an inch from said cylindrical member to the point at which said cable first makes contact with said curvilinear section of said tilt unit.

11. The pan and tilt mechanism according to claim 6 wherein said second motor includes a rotatable drive shaft oriented parallel to said vertical axis.

12. The pan and tilt mechanism according to claim 11 wherein said second motor controls a second drive means, said second drive means for rotating said pan unit about said vertical axis.

13. The pan and tilt mechanism according to claim 12 wherein said curvilinear section of said pan unit lies in a horizontal plane, and wherein said cable includes a first and second end, said first end fixably attached to a first point of said curvilinear section of said pan unit, said second end fixably attached to a second point of said curvilinear section of said pan unit, and further including a cylindrical member fixably attached to said drive shaft of said second motor and whereby a portion of said cable contacts said cylindrical member.

14. The pan and tilt mechanism according to claim 13 wherein said cable is wrapped around said cylindrical member a plurality of times such that rotation of said drive shaft of said second motor results in a corresponding rotation of said pan unit about said vertical axis.

15. The pan and tilt mechanism according to claim 14 wherein said cable extends no greater that one-quarter of an inch from said cylindrical member to the point at which said cable first makes contact with said curvilinear section of said pan unit.

16. A pan and tilt mechanism for the mounting of a camera comprising:

a) a fixed base unit;

b) a pan unit pivotally attached to said base unit, said pan unit rotatable about a vertical axis;

c) a tilt unit upon which said camera is affixed, said tilt unit having a curvilinear section lying substantially in a vertical plane with a cable extending along a peripheral portion of said curvilinear section and attached thereto at two ends of said cable, said tilt unit pivotally attached to said pan unit, said tilt unit rotatable about a horizontal axis;

d) a first motor positionally fixed on said pan unit for controllably rotating said tilt unit about said horizontal axis; and, e) a second motor positionally fixed on said base unit and in mechanical communication with said cable for controllably rotating said pan unit about said vertical axis.

17. The pan and tilt mechanism according to claim 16 wherein said first motor includes a rotatable drive shaft oriented parallel to said horizontal axis.

18. The pan and tilt mechanism according to claim 17 wherein said first motor controls a first drive means, said first drive means for rotating said tilt unit about said horizontal axis.

19. The pan and tilt mechanism according to claim 18 wherein said cable is wrapped around a cylindrical member attached to the drive shaft of said first motor a plurality of times such that rotation of said drive shaft of said first motor results in a corresponding rotation of said tilt unit about said horizontal axis.

20. The pan and tilt mechanism according to claim 19 wherein said cable extends no greater than one-quarter of an inch from said cylindrical member to the point at which said cable first makes contact with said curvilinear section of said tilt unit.

* * * * *